Aug. 25, 1942.  C. SAUZEDDE  2,293,854
MULTISTAGE COMPRESSOR FOR HYDROSTATIC BRAKING SYSTEMS
Filed April 18, 1940  3 Sheets-Sheet 1

Inventor
Claude Sauzedde
By
Attorneys

Aug. 25, 1942.   C. SAUZEDDE   2,293,854
MULTISTAGE COMPRESSOR FOR HYDROSTATIC BRAKING SYSTEMS
Filed April 18, 1940   3 Sheets-Sheet 2
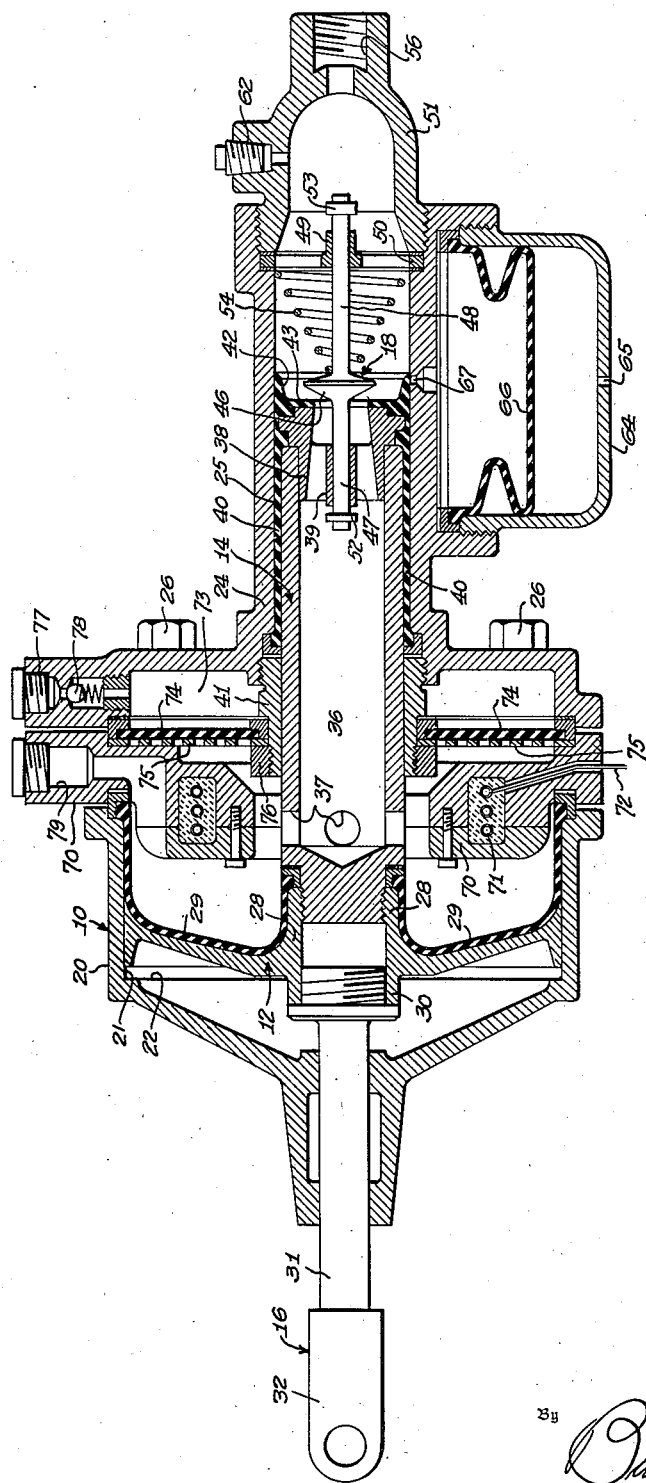
Fig. 2.
Inventor
Claude Sauzedde
By
Attorneys Aug. 25, 1942.   C. SAUZEDDE   2,293,854
MULTISTAGE COMPRESSOR FOR HYDROSTATIC BRAKING SYSTEMS
Filed April 18, 1940   3 Sheets-Sheet 3
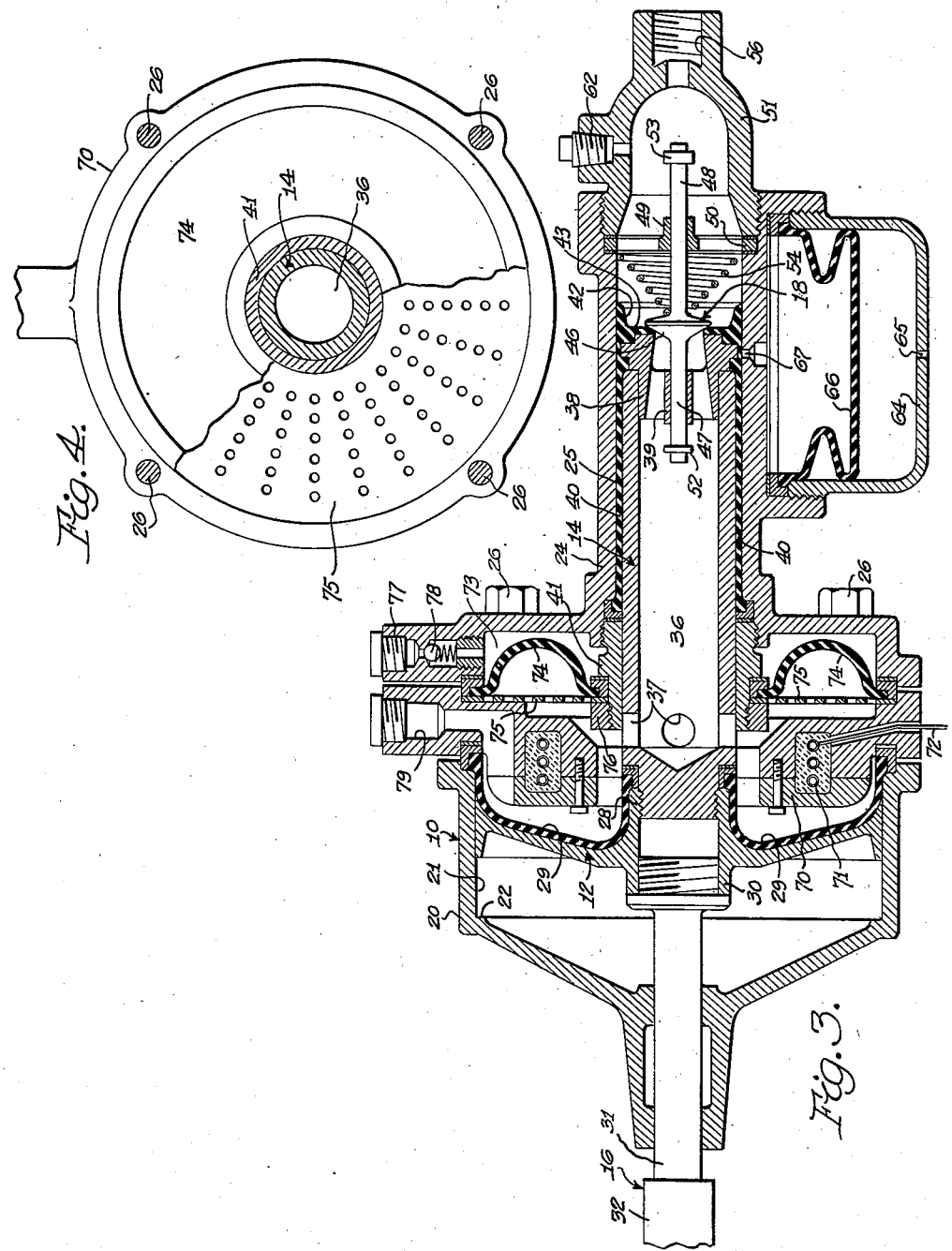
Inventor
Claude Sauzedde
By
Attorneys Patented Aug. 25, 1942

2,293,854

UNITED STATES PATENT OFFICE 2,293,854

MULTISTAGE COMPRESSOR FOR HYDROSTATIC BRAKING SYSTEMS

Claude Sauzedde, Detroit, Mich., assignor to Detroit Hydrostatic Brake Corporation, Detroit, Mich., a corporation of Michigan Application April 18, 1940, Serial No. 330,328

3 Claims. (Cl. 60—54.6)

This invention relates, in general, to vehicle brakes of the hydrostatic type and, in particular, to a new and improved multi-stage compressor therefor.

Heretofore, two-stage compressors for hydrostatic braking systems have, in practically each instance, employed a primary piston and a secondary piston which have been unitarily movable during a portion of the braking operation and relatively movable one to the other during the remainder of said operation. This unitary movement was supposedly designed to exist during the clearance take-up between the shoes and drums, whereas the relative movement was designed to exist during the actual setting of the brakes. Both of these movements were dependent upon some means or other which would cause the primary piston to move with the secondary piston until the shoes engaged the drums, whereupon the back pressure in the system would be so great that said means would automatically become ineffective and the primary piston would stop, the secondary piston, however, continuing so as to set the brakes. In other words, the movement of the primary piston was expected to move the system fluid as a whole, by which movement brake clearances would be taken up quickly and by minimum pedal movement, and the succeeding movement of the secondary piston was expected to perform the actual boosting of the fluid pressure exclusively thereahead for setting the brakes, also by minimum pedal movement. However, the aforementioned means usually comprised some sort of a spring arrangement the characteristics of which necessarily had to reside within predetermined limits, and, in the event the viscosity of the system fluid became very high due to very low atmospheric temperatures, said spring arrangement would be unable to cope with this unexpected condition and would fail to move the primary piston. Obviously, the entire braking action would then have to be performed by the secondary piston and the comparatively small quantity of fluid moved thereby, such condition necessitating an excessively long pedal stroke and resulting in an extremely sluggish and poor brake application which would be absolutely foreign to the pre-calculated design thereof.

Therefore, one of the objects of this invention is to provide a new and improved multi-stage compressor for a hydrostatic braking system which is operable in stricter accordance with predetermined calculations therefor than heretofore.

Another object is to provide a new and improved multi-stage compressor for a hydrostatic braking system the accurate operation of which is unaffected by extreme conditions of fluid viscosity.

Another object is to provide a new and improved multi-stage compressor for a hydrostatic braking system which is more efficiently operable with lesser need for repair and adjustment over longer periods of use than heretofore.

Another object is to provide a new and improved multi-stage compressor for a hydrostatic braking system wherein the primary piston thereof is adapted for flawlessly performing the operation of clearance take-up at the wheels regardless of the viscosity of the fluid to be moved by said piston during such operation.

Another object is to provide a new and improved two-stage compressor for a hydrostatic braking system which comprises fewer parts than structures of a similar type at present well known and in use and which parts cooperate to provide a unit automatically operable with maximum efficiency, minimum effort, regardless of atmospheric temperature or the viscosity of the braking medium, and without need for repair or adjustment.

Another object is to provide a new and improved two-stage compressor for a hydrostatic braking system wherein provision is made for unitary movement of its two pistons during the performance of both stages thereof, thereby alleviating its dependency for accurate and efficient braking operation upon any but ideal atmospheric conditions.

Another object is to provide a new and improved multi-stage compressor for a hydrostatic braking system wherein the temperature of the braking medium may, if desired, be controlled so as to control its viscosity.

Other objects and advantages of the invention will become readily apparent from a reference to the following specification taken in conjunction with the accompanying drawings of which there are three (3) sheets and wherein:

Figures 1, 2 and 3 are longitudinal sectional views through the compressor and showing, respectively, the parts thereof as they appear when the system is at rest, at the moment when the clearances between the shoes and drums have just been taken up, and when the shoes have been fully set in the drums;

Fig. 4 is a section taken along the lines 4—4 in Fig. 1 with the right half of the master cylinder casting removed therefrom, said view being partly broken away to illustrate more clearly some of the details of the construction thereof; and Fig. 5 is a diagrammatic sketch of a parts assembly of a braking system employing the herein described compressor.

Figure 1:
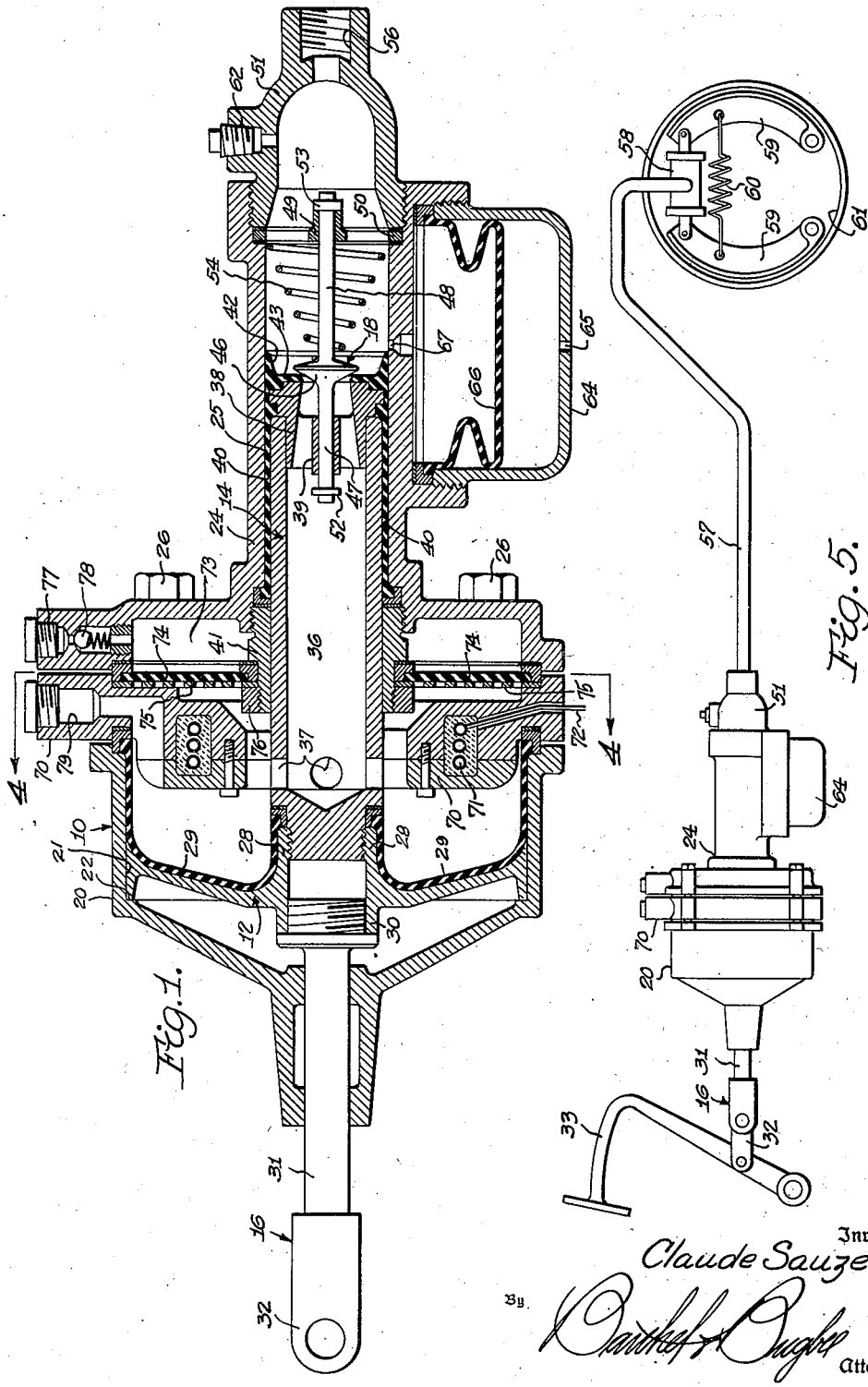

Referring to the figures, particularly Fig. 1 which shows the braking system at rest, there is shown a two-stage compressor, generally indicated at 10, which is employable in a hydrostatic braking system, such as is particularly adaptable for a vehicle and is diagrammatically illustrated in Fig. 5. In general, compressor 10 comprises primary and secondary pistons, generally indicated at 12 and 14, respectively, an actuating mechanism for said pistons, generally indicated at 16, and a fluid control mechanism, generally indicated at 18.

An open-ended casing 20 is employed for housing the primary piston 12 and is internally formed with a cylindrical bore 21 along which said piston is reciprocable, the rear end of said bore being shouldered, as at 22, to provide a limit position of retraction for said piston, and the front end of said bore residing at the front end of said casing. Another open-ended casing 24 is employed for housing the secondary piston 14 and is internally formed with a cylindrical bore 25 of substantially lesser diameter than that of the bore 21, as is usual in two-stage compressors. In assembly, the two casing sections 20 and 24 are removably joined together, by means such as bolts 26, in end-to-end relationship with their bores 21 and 25 coaxially aligned and, as will be seen, inter-communicated.

Since it is intended that the primary piston 12 be unitarily movable with the secondary piston 14, for the purpose of illustration the former piston is shown formed with a central, internally threaded boss 28 for threadedly receiving the threaded, extended, rear end of the latter piston so as to provide for such unitary movement. This removable connection between the two pistons 12 and 14 also serves to secure thereby and thereat the inner end of an annular, cup-shaped, flexible sealing member 29 which extends from said connection radially outwardly along the working surface of said piston 12 and is secured at its outer end by and at the removable connection between the two casing sections 20 and 24, said sealing member tending to prevent fluid leakage past said piston 12 into the area therebehind. The piston 12 is also shown formed with a rear, central boss 30 for preferably positive connection therewith of the front end of a rod 31 which extends rearwardly through and from the casing section 20 to be positively connected at its outer end to one end of a link 32, the other end of said link being pivotally connected, see Fig. 5, in the usual manner to the usual brake pedal lever 33. In other words, link 32, rod 31, piston 12 and piston 14 move as a unit upon actuation of lever 33, and the outer end of seal 29 is stationary while its inner end is free to move with said unit, it being appreciated by now that said link, rod and lever comprise the actuating mechanism 16 aforementioned.

The secondary piston 14 is hollow to provide an axially elongated chamber 36 which extends from a short distance ahead of the connection between the two pistons 12 and 14 through the entire remainder of the length of said piston 14, said chamber 36 and the chamber ahead of said piston 12 being intercommunicated by means of annularly spaced apertures 37 formed through said piston 14. In the head end of the piston 14 there is press fitted or otherwise securely held to the wall of the chamber 36 the outer section 38 of an elongated spider member which member, as is usual, also includes an inner section 39, these sections 38 and 39 being, as is usual, integrated but allowing free communication between the rear and front ends thereof so that the portion of the bore 25 residing ahead of said spider 38—39 is communicable with the portion of the chamber 36 residing behind said spider as well as with the chamber residing ahead of the piston 12. The front end of the section 38 of the spider 38—39, which extends ahead of the inner section 39 of said spider, is formed so as to secure and rigidly hold thereat the front end of a cylindrically-shaped, flexible sealing member 40 which extends rearwardly therefrom along the wall of the bore 25 externally of the piston 14 and is rigidly and stationarily held at its rear end to the casing section 24 by means of a nut 41 threadedly carried by and internally of said section 24 at the rear end of said bore 25. This sealing member 40 is preferably formed at its front end with a cylindrically-shaped lip 42 which extends for a short distance ahead of the spider 38—39 along the wall of the bore 25 and is also preferably formed with an annularly-shaped, radially inwardly extending lip 43 which overlies, exclusively, the front end of the outer section 38 of said spider. The flexibility of the seal 40 naturally permits stretchability thereof upon movement of the piston 14, and the seal itself prevents fluid passage between said piston and the wall of the bore 25.

The fluid control mechanism 18 comprises a valve head 46 to which there is integrally connected a pair of oppositely directed stems 47 and 48, said stem 47 extending rearwardly from said head through the inner section 39 of the spider 38—39, and said stem 48 extending forwardly from said head through the inner section 49 of another spider which includes an outer section 50 secured between the front end of the casing section 24 and a removable closure member 51 therefor. The free end of the stem 47 carries a stop 52, the free end of the stem 48 carries another stop 53, and between the front end of the head 46 and the outer section 50 of the spider 49—50 there is carried a spring 54 which, as is seen in the "at rest" condition in Fig. 1, tends to support the valve 46—47—48 with the stop 53 in abutment with the inner section 49 of said spider 49—50, the stop 52 in spaced relation to the inner section 39 of the spider 38—39, and the head 46 in spaced relation to the resilient seat therefor provided by the lip 43 of the seal 40—42—43. It goes without saying that the stop 52 limits the forward movement of the valve 46—47—48 relatively to the piston 14 and that the stop 53 limits the rearward movement of said valve relatively to said piston. Further discussion of the control 18 appears subsequently.

The closure member 51 for the casing section 24 is provided with outlet means 56 in communication with the bore 25, and to said means there is connected the usual fluid line 57 which is in fluid communication with the usual wheel cylinder units 58 of the braking system, as shown in Fig. 5. Each of the units 58, as is usual, has its pressure responsive member (not shown) operatively connected to the free ends of the pivotally supported shoes 59, and these shoes are interconnected by springs 60 which normally tend to hold said shoes in spaced relation to the drum or braking surfaces 61 therefor. Member 51 is also provided with a normally closed opening 62 which is in communication with the bore 25 and by which the system in its entirety may be charged with braking fluid.

In order to compensate for volumetric changes in the system fluid due to temperature variations, the casing section 24 carries a chamber-forming member 64, vented at 65, in which there is supported a diaphragm 66, said diaphragm subdividing the chamber so as to provide an air chamber therebelow which is open to the atmosphere by means of said vent and a fluid chamber thereabove which is open to the bore 25 by means of an aperture 67 formed in the wall of said section 24. It will be noted, by referring to Fig. 1, that the aperture 67 is so positioned as to be disposed immediately ahead of the lip 42 when the system is totally at rest, so that, upon the least protractile movement of the piston unit 12—14, the fluid chamber above the diaphragm 66 will be closed off from the bore 25.

It may be desired, in the event of a very cold spell in the weather, to have provided means whereby the fluid in the system may be heated so as to decrease its viscosity to a value whereat ready flowability thereof is assured. To this end, a hollow, annular body 70 of heat conductive material, such as aluminum, is arranged in telescopic relationship with the rear end of the piston 14 directly ahead of the piston 12 and is secured at its periphery to and between the casing sections 20 and 24 by means of the bolts 26. This body 70 serves to diminish the space ahead of the piston 12 without interfering with the displacement of fluid therefrom through the apertures 37, thereby reducing the quantity of fluid necessary in the system, and it also serves to carry, internally thereof, a heating element 71 which is electrically connected, by means of conduits 72 which lead outwardly from said body, to the electrical system (not shown) of the vehicle and controlled in any well known and desirable manner.

As will be understood when the action of the valve 46—47—48 is described, the unitary nature of the pistons 12 and 14 necessitates the provision of means for accommodating the fluid displaced by said piston 12 upon the closing of said valve. To this end, the casing section 24 is so formed at its rear end as to provide an annular air chamber 73 when said casing section and the casing section 20 have been assembled together, said chamber surrounding the nut 41 and residing ahead of an annular, imperforated, flexible diaphragm 74 which resides in abutting engagement with the front face of an annular, perforated, inflexible plate or wall member 75. The outer ends of both the diaphragm 74 and the wall member 75 reside stationarily against cooperating shoulders provided therefor in the casing section 24 and body member 70, and the inner ends thereof are stationarily held in place by means of a nut 76 threadedly carried on the rear end of the nut 41 and tightened against said wall member to hold the latter against said diaphragm and said diaphragm against a shoulder provided therefor in said nut 41. In other words, the air chamber 73 is sealed from the chamber residing ahead of the piston 12 by means of the diaphragm 74 but is subjected to the pressure in the latter chamber by means of the perforations in the wall member 75 and the flexibility of said diaphragm. Furthermore, the inflexibility of the wall member 75 limits the bulging or stretching of the diaphragm 74 in a single direction which is the direction of protraction of the piston unit 12—14.

One purpose of the air chamber 73 is to entertain or accommodate the bulging of the diaphragm 74 thereinto due to the displacement of the fluid ahead of the piston 12 by said piston. Another purpose of the air chamber 73 is to govern the time this bulging is to take place. In other words, the movement of the primary and larger piston 12 is for the purpose of bodily moving the fluid as quickly and with as short a pedal stroke as possible to take up clearances between the shoes 59 and braking surfaces 61 before the actual boosting effect of the secondary and smaller piston 14 comes into play (which occurs when the back pressure in the line closes the valve 46—47—48), and for that reason bulging of the diaphragm 74 should be prevented by the pressure in the chamber 73 as long as there is any shoe-drum clearance, this obviously eliminating waste movement of said piston 12. Therefore, the casing section 24 is formed with an inlet 77 leading to the air chamber 73 and in this inlet there is provided a check valve 78 which is preferably of the type for controlling air flow in both directions therepast. So, knowing the total pressure necessary to overcome the springs 54 and 60 and the inevitable resistance to fluid flow through the system, the inlet 77 may be connected to a source of air pressure (not shown) and the chamber 73 charged to a similar pressure or one slightly thereabove so that there will be no deflection of the diaphragm 74, notwithstanding the fluid pressure exerted thereupon by the primary piston 12, until the valve 46—47—48 closes upon the actual engagement of the shoes 59 and their respective rotating braking surfaces 61.

During the charging of the system with fluid it may be desired to bleed the air therefrom, and to this end there is provided a normally closed bleeder opening 79 which is formed in the body member 70 and is in communication with the chamber ahead of the piston 12.

Assuming the system has been properly filled with braking fluid and the air chamber 73 properly charged, the "at rest" condition thereof will first be considered, by referring to Fig. 1. In this figure, the piston 12 is in abutment with the shoulder 22, and the piston 14 is in such position that the lip 42 of the seal 40 carried by said piston 14 is immediately behind the aperture 67, exposing the fluid chamber defined by the diaphragm 66 to the bore 25 and the remainder of the fluid system. There is no material pressure being exerted by the spring 54 on the valve head 46, and said head is off its seat 43, the stop 52 is off its seat 39, and the stop 53 is on its seat 49. There is no deflection of the diaphragm 74 because, though the air pressure in the chamber 73 is greater than the liquid pressure in the chamber ahead of the piston 12, the rigidity and inflexibility of the wall member 75 prevent such deflection.

Now assume that pressure is applied to the pedal 33. The pistons 12 and 14 will move unitarily and the fluid chamber defined by the diaphragm 66 will be cut off from the rest of the fluid system by the protraction of the lip 42 past the aperture 67, thus subjecting the system fluid exclusive of that in said chamber to the pressures established by the protraction of said pistons. Until the shoes 59 engage their respective drum surfaces 61, the pressure created by the advance of the piston 12 will be transmitted through the apertures 37, chamber 36, spider 38—39, open valve 46—47—48, spider 49—50, outlet 56, and line 57, to the wheel cylinders 58; this pressure will be insufficient to deflect the diaphragm 74, because of the air pressure in chamber 73, but will be greater than the combined pressures of the springs 54 and 60, thus accounting for the open condition of the valve 46—47—48 as long as clearances exist at the wheel brakes. In other words, during this clearance take-up stage the total pressure ahead of the valve head 46 will be less than the liquid pressure therebehind, so that the valve 46—47—48 will have substantially unitary movement with the piston 14, thereby remaining open or even enjoying a greater spacing from its seat 43, the stop 52 limiting this increase in opening, however. It will be seen, then, that the primary piston 12, which quickly moves the bulk of the system fluid for taking up clearances at the wheel brakes with a minimum pedal stroke, is positive in its movement because it is integral with the rod 31 and, therefore, is not affected in its operation by heretofore deleterious effects caused by said fluid being highly viscous. Furthermore, no power is lost into the chamber 73 because the air pressure therein is sufficient to prevent it.

When the clearances between the shoes 59 and their respective braking surfaces 61 have been just reduced to zero, the back pressure ahead of the valve head 46 will be on the verge of becoming greater than the liquid pressure therebehind, the valve 46—47—48, as a result, being ready to close and to isolate the portion of the system fluid residing ahead of said head from the portion of the system fluid residing behind said head. At this exact moment of reduction to zero of the brake clearances, the pressures on either side of the diaphragm 74 will be substantially equal and there will be, therefore, no deflection thereof. These conditions are shown in Fig. 2. On the other hand, if the compressor 10, having its parts positioned as in Fig. 2, is subjected to the least added increment of pedal pressure, the response will be a closing of the valve 46—47—48 simultaneously with a deflecting of the diaphragm 74.

Pedal pressure added to the system immediately following the closing of the valve 46—47—48 effectuates unitary movement of the pistons 12 and 14 and said valve, and the resulting pressures created by the movement of said pistons are independent of each other and absolutely non-additive, as distinguished from the pressures created thereby prior to the closing of said valve. This pressure created by the movement of the piston 14 is transmitted through the line 57 to the cylinders 58 and is employed exclusively in the boosting of the pressure thereat to set the brakes, this being accomplished by a minimum pedal movement following said valve closing; on the other hand, the pressure created by the movement of the piston 12 is transmitted through the perforations in the wall or plate 75, causing deflection of the diaphragm 74 into the air chamber 73 and such deflection thereby representing absorption of the back pressure which would otherwise be created by the movement of said piston 12 and which would tax the operator's efforts to set the brakes. These conditions are shown in Fig. 3.

Upon brake release, the pistons 12 and 14 and the closed valve 46—47—48 retract unitarily until the pressure behind the head 46 becomes greater than that thereahead (which occurs approximately at the time the stop 53 reaches its seat 49), whereupon said valve opens and said pistons continue their retraction until said piston 12 reaches its stop 22. In the interim, when the pressure in the chamber ahead of the piston 12 becomes less than that in the chamber 73, the diaphragm 74 returns to its normal position of rest against the plate or wall 75. Thereafter, the system is ready for another brake application.

Although the invention has been described with some detail it is not intended that such description is to be definitive of the limits of the inventive idea. The right is reserved to make such changes in the details of construction and arrangement of parts as will fall within the purview of the attached claims.

What I claim is:

1. An actuating mechanism for a hydrostatic braking system comprising, a housing defining a pair of fluid cylinders having different diameters and disposed in end-to-end relationship and intercommunicated, said housing being formed with an outlet for the smaller cylinder, piston means having a section disposed within the larger cylinder and another section rigidly connected to said first-named section and disposed within said smaller cylinder, said second-named piston section being hollow throughout its length and formed at its rear end with aperture means operable for continually communicating the interior of said second-named piston section with the portion of said larger cylinder ahead of said first-named piston section, movable valve means arranged at the front end of said second-named piston section and operable during protraction of said piston means for communicating both of said sections with said outlet for a predetermined period and for thereafter communicating only said second-named section with said outlet upon continued protraction of said piston means, a sleeve fixedly carried by said housing in contact and telescopic relation with the external wall surface of said second-named piston section ahead of said aperture means, an annular, imperforated diaphragm of flexible material secured at its outer periphery to said housing and at its inner periphery to said sleeve and defining a closed chamber thereahead, means consisting of a quantity of compressible fluid in said chamber and effective in combination with said diaphragm to provide a pressure capable of resisting change in volume of said fluid during said period but for yielding to volume change during said continued protraction, and an annular, perforated diaphragm of inflexible material secured similarly as said first-named diaphragm and in abutment with the rear face thereof.

2. An actuating mechanism for a hydrostatic braking system comprising, a housing defining a pair of fluid cylinders having different diameters and disposed in end-to-end relationship and intercommunicated, said housing being formed with an outlet for the smaller cylinder, piston means having a section disposed within the larger cylinder and another section rigidly connected to said first-named section and disposed within said smaller cylinder, said second-named piston section being hollow throughout its length and formed at its rear end with aperture means operable for continually communicating the interior of said second-named piston section with the portion of said larger cylinder ahead of said first-named piston section, movable valve means arranged at the front end of said second-named piston section and operable during protraction of said piston means for communicating both of said sections with said outlet for a predetermined period and for thereafter communicating only said second-named section with said outlet upon continued protraction of said piston means, a sleeve fixedly carried by said housing in contact and telescopic relation with the external wall surface of said second-named piston section ahead of said aperture means, an annular, imperforated diaphragm of flexible material secured at its outer periphery to said housing and at its inner periphery to said sleeve and defining a closed chamber thereahead, means consisting of a quantity of compressible fluid in said chamber and effective in combination with said diaphragm to provide a pressure capable of resisting change in volume of said fluid during said period but for yielding to volume change during said continued protraction, and means carried within said cylinder portion for selectively changing the temperature of the braking fluid therewithin.

3. An actuating mechanism for a hydrostatic braking system comprising, a housing defining a pair of fluid cylinders having different diameters and disposed in end-to-end relationship and intercommunicated, said housing being formed with an outlet for the smaller cylinder, piston means having a section disposed within the larger cylinder and another section rigidly connected to said first-named section and disposed within said smaller cylinder, said second-named piston section being hollow throughout its length and formed at its rear end with aperture means operable for continually communicating the interior of said second-named piston section with the portion of said larger cylinder ahead of said first-named piston section, movable valve means arranged at the front end of said second-named piston section and operable during protraction of said piston means for communicating both of said sections with said outlet for a predetermined period and for thereafter communicating only said second-named section with said outlet upon continued protraction of said piston means, a sleeve fixedly carried by said housing in contact and telescopic relation with the external wall surface of said second-named piston section ahead of said aperture means, an annular, imperforated diaphragm of flexible material secured at its outer periphery to said housing and at its inner periphery to said sleeve and defining a closed chamber thereahead, means consisting of a quantity of compressible fluid in said chamber and effective in combination with said diaphragm to provide a pressure capable of resisting change in volume of said fluid during said period but for yielding to volume change during said continued protraction, means carried within said cylinder portion for selectively changing the temperature of the braking fluid therewithin, and an annular, perforated diaphragm of inflexible material secured similarly as said first-named diaphragm and in abutment with the rear face thereof.

CLAUDE SAUZEDDE.